United States Patent
Valcic et al.

(10) Patent No.: US 9,403,464 B2
(45) Date of Patent: Aug. 2, 2016

(54) CADDY ORGANIZER FOR USE WITH AN AIRPLANE TRAY TABLE

(71) Applicant: Laurnika Designs LLC, Dublin, CA (US)

(72) Inventors: Nikola Valcic, Dublin, CA (US); Laura H. Romero, Dublin, CA (US)

(73) Assignee: Laurnika Designs LLC, Dublin, CA (US)

( * ) Notice: Subject to any disclaimer, the term of this patent is extended or adjusted under 35 U.S.C. 154(b) by 175 days.

(21) Appl. No.: 14/073,168

(22) Filed: Nov. 6, 2013

(65) Prior Publication Data

US 2015/0122159 A1 May 7, 2015

(51) Int. Cl.
| | |
|---|---|
| A47B 23/00 | (2006.01) |
| B60N 3/00 | (2006.01) |
| B60R 7/04 | (2006.01) |
| B64D 11/06 | (2006.01) |

(52) U.S. Cl.
CPC ............. *B60N 3/004* (2013.01); *B60R 7/043* (2013.01); *B64D 11/0636* (2014.12); *B64D 11/0638* (2014.12)

(58) Field of Classification Search
CPC ...... A47B 23/044; B60N 3/001; B60N 3/002; B60N 3/02; B64D 11/0636; B64D 11/0638; B60R 7/043
USPC ...................................................... 108/42, 44
See application file for complete search history.

(56) References Cited

U.S. PATENT DOCUMENTS

| | | | | |
|---|---|---|---|---|
| 4,597,605 | A * | 7/1986 | Gilbert | A47C 7/425 297/183.5 |
| 4,655,343 | A * | 4/1987 | Lane | A45C 3/004 190/111 |
| 5,642,674 | A * | 7/1997 | Joye, Sr. | A47B 23/002 108/25 |
| 5,800,001 | A * | 9/1998 | Anastasi | A45C 3/00 294/141 |
| 5,878,672 | A | 3/1999 | Ostermann et al. | |
| 6,182,931 | B1 * | 2/2001 | Richard | B60N 2/6009 108/44 |
| 6,193,118 | B1 * | 2/2001 | Kearl | A47C 7/0095 108/43 |
| 6,523,653 | B2 * | 2/2003 | Roegner | A45C 3/00 190/109 |
| 6,763,986 | B2 * | 7/2004 | Santos | A45C 9/00 224/275 |
| 7,503,440 | B2 * | 3/2009 | Gormick | A45C 3/02 190/102 |
| 8,231,094 | B1 | 7/2012 | Barnes, Jr. | |
| 2001/0039903 | A1 * | 11/2001 | Patterson | B60N 3/004 108/44 |
| 2006/0102667 | A1 * | 5/2006 | Padilla | A45C 5/045 224/153 |
| 2008/0156604 | A1 | 7/2008 | Franco et al. | |
| 2010/0015882 | A1 * | 1/2010 | Givens | A63H 33/006 446/227 |
| 2010/0018820 | A1 | 1/2010 | Sartee | |
| 2013/0093220 | A1 | 4/2013 | Pajic | |
| 2013/0169009 | A1 | 7/2013 | Petersen et al. | |

OTHER PUBLICATIONS

"Flight Bags by Genius Pack," The Grommet, http://www.thegrommet.com/genius-pack-high-altitude-flight-bag, printed on Oct. 28, 2013, three pages.

Kallman, Isabel, "Traveling with Kids: some fun & helpful products," http://alphamom.com/family-fun/travel-family-fun/traveling-with-ki . . . , printed on Dec. 3, 2013, nine pages.

Carmichael, Scott, "Three products for people who carry too much stuff on the plane," http://www.gadling.com/2009/04/24/three-products-for-people-who . . . , Apr. 24, 2009, 13 pages.

International Search Report, International Application No. PCT/2014/017737, mailed on Jul. 2, 2014, 12 pages.

* cited by examiner

*Primary Examiner* — Hanh V Tran
(74) *Attorney, Agent, or Firm* — Lewis Rice LLC (57) ABSTRACT

An organizer for use with an airplane tray table or similar structure which organizer allows for improved utilization of space by providing for storage compartments designed to hold objects in vertical orientation. The organizer is designed to attach to the tray table and to the latch which is used to hold the tray table in its upright and locked position.

16 Claims, 8 Drawing Sheets

CADDY ORGANIZER FOR USE WITH AN AIRPLANE TRAY TABLE

BACKGROUND

1. Field of the Invention

This disclosure is related to the field of travel organizers, specifically to organizers for use in connection with airline travel that interact with an airplane tray table.

2. Description of the Related Art

According to recent estimates, businesses now spend more than one trillion dollars per year in business-related travel expenses, with the United States alone accounting for more than $250 billion. With the widespread integration of technology into business life, business travelers now carry with them a wide assortment of computing devices. Gone are the days when the business traveler carried a wallet and a garment bag. Today's business traveler may have a suitcase, garment bag, and laptop bag, and may carry a laptop, a tablet PC, a smart phone, and peripherals. Often, the business traveler will make use of these devices during a flight.

There are several difficulties with using technology devices on an airplane. First, most aircraft, even in premium seating areas, lack flexible workspace, generally offering only a flimsy fold-down tray table. Typically, the seats in an aircraft are arranged in a grid, such that each seat is positioned laterally in the fuselage in alignment with a seat in the row immediately more proximate to the fore of the aircraft. On many aircraft, the aft side of each passenger seat contains a tray table held upright and flush against a tray-shaped recess in the back of the seat by a clip or latch. The latch is generally an elongated element rotationally attached to the seat back such that when the latch is rotated into a "locked" position, a portion of the latch extends below the top of the tray-shaped recess and, when the tray table is in the recess, the extended portion of the latch inhibits the tray table from descending. When the latch is rotated into "open" position, no portion of the latch extends far enough below the top of the tray-shaped recess to hold the tray table in place, and the tray table may be lowered.

This tray table is not spacious. A typical economy-class tray table is around 16.5 inches wide and 10 inches deep, allowing room for perhaps a laptop computer and little else. When a laptop is on the tray table, there is very little room for a drink or meal and, even if the laptop is arranged so that a drink can fit on the tray table, placing a drink near a laptop on an airline tray table can be a bad idea, as routine airline turbulence or movement in the seat to which the tray table is attached may upset the beverage, causing spillage unto the laptop and damaging the computer, possibly with a loss of data.

The tray table also is not flexible. Perhaps partially because of the above limitations, business travelers are increasingly turning to tablet PCs. However, whereas most laptop computers have the inherent ability to stably hold the screen portion upright, tablet PCs generally do not. The Apple iPad™ for example does not include a stand, and both factory and aftermarket stands are relatively unstable. Again, movement of the tray table, whether from the occupant of the seat to which the tray table is attached or turbulence, could knock the tablet off the stand. Beyond annoying and frustrating the user, this poses a risk of damage to the tablet. There is typically a gap between the front edge of the tray table and the open side of the passenger seat, and the tablet could fall through this gap.

Further, even when the traveler has this equipment set up, other passengers in the same row often move about the aircraft, such as to use the lavatory or retrieve items from overhead storage. The rows on most airplanes, especially in economy class seating, are too narrow for other passengers to pass by unless a lowered tray table is raised. This requires the person using the equipment to remove it all from the tray table, fold the tray table up, and set the equipment aside so that the other passenger may enter or exit the row. This is inconvenient and interrupts the traveler's work flow, particularly for laptops, which often go into automatic hibernation when the screen is lowered. Further, when there is a drink on the tray table, the traveler must also hold the drink while removing and replacing the equipment, posing further risk of spillage and equipment damage.

SUMMARY

The following is a summary of the invention which should provide to the reader a basic understanding of some aspects of the invention. This summary is not intended to identify critical components of the invention, nor in any way to delineate the scope of the invention. The sole purpose of this summary is to present in simplified language some aspects of the invention as a prelude to the more detailed description presented below.

This disclosure generally provides an organizer for use with an airplane tray table or similar structure which organizer allows for improved utilization of space by providing for storage compartments designed to hold objects in vertical orientation. The organizer is designed to attach to the tray table and to the latch which is used to hold the tray table in its upright and locked position.

There is described herein, among other things, a portable organizer or caddy comprising: a main body having an upright element, a table element, and a hinge connecting them; a sleeve connected to said table element, said sleeve being sized and shaped to secure said table element to a tray table in an airplane; a hook connected to said upright element, said hook being sized and shaped to secure said upright element to a latch for holding said tray table in an upright and locked position; and at least one compartment attached to said upright element, said compartment holding a tablet computer in a generally vertical orientation.

In an embodiment of the organizer, said upright element and said table element are arranged in a generally "L" shaped arrangement when said sleeve is secured to said tray table and said hook is secured to said latch.

In an embodiment, the organizer further comprises a compartment sized and shaped to hold a smart phone.

In an embodiment, the organizer further comprises a compartment sized and shaped to hold a e-reader.

In an embodiment, the organizer further comprises a work surface attached to said table element.

In an embodiment, the organizer further comprises a handle attached to at least one of said upright element or said table element.

In an embodiment, the organizer further comprises a second hook attached to said table element, said second hook being sized and shaped to secure said upright element to a latch for holding said tray table in an upright and locked position.

In an embodiment, the organizer further comprises a cup compartment for holding a beverage vessel. The beverage vessel may comprises an open-topped cup, the cup compartment may be rotationally attached to said organizer, and/or the cup compartment may be attached to a flap that is in turn attached to said table element.

In an embodiment, the organizer further comprises a flap attached to said table element.

There is also described herein a method of providing organization to items on a tray table, the method comprising: providing an organizer comprising: a main body having an upright element, a table element, and a hinge connecting them; a sleeve connected to said table element, said sleeve being sized and shaped to secure said table element to a tray table in an airplane; a hook connected to said upright element, said hook being sized and shaped to secure said upright element to a latch for holding said tray table in an upright and locked position; and at least one compartment attached to said upright element; attaching said sleeve to said tray table in said airplane; attaching said hook to said latch for holding said tray table in an upright and locked position; and placing an item in said compartment to organize said tray table.

In an embodiment of the method, said organizer further comprises a flap attached to said table element, said flap hanging from said table element over a first side of said tray table.

In an embodiment of the method, said organizer comprises a second flap attached to said table element, said second flap hanging from said table element over a second side of said tray table, said second side opposing said first side.

In an embodiment of the method, said organizer further comprises, a cup compartment for holding a beverage vessel, which may be an open-topped cup, said cup compartment being rotationally attached to said organizer.

In an embodiment of the method, said organizer further comprises a second hook connected to said table element, said hook being sized and shaped to secure said table element to a latch for holding said tray table in an upright and locked position.

In an embodiment the method further comprises connecting said second hook to said latch without disconnecting said sleeve from said tray table.

BRIEF DESCRIPTION OF THE DRAWINGS

FIG. 5 depicts the organizer of FIG. 1 in an open but not deployed configuration which shows how the flaps fold in.

DESCRIPTION OF THE PREFERRED EMBODIMENT(S)

The following detailed description and disclosure illustrates the device by way of example and not by way of limitation. This description will clearly enable one skilled in the art to make and use the disclosed systems and methods, and describes several embodiments, adaptations, variations, alternatives and uses of the disclosed systems and methods. As various changes could be made in the above constructions without departing from the scope of the disclosures, it is intended that all matter contained in the above description or shown in the accompanying drawings shall be interpreted as illustrative and not in a limiting sense.

Described herein is an organizer caddy or portable organizer (10), generally for use in air travel which allows for organization in the utilization of tray table space. FIGS. 1-5 provide for various depictions of an embodiment of an organizer (10). The organizer (10) generally comprises a main body (100) formed from a generally rectangular upright element (101) and a generally rectangular table element (103). The table element (103) is generally foldably attached via one end of the table element (103) to one end of the upright element (101) via a hinge (115). Preferably, each of the elements (101) and (103) is of similar, generally rectangular shape, although either can be of any shape and relative size. In the depicted embodiment, the two elements (101) and (103) are attached lengthwise along a longer edge of each rectangle. The upright element (101) generally has an interior surface (117) and an opposing exterior surface (119). The table element (103) also has an interior surface (137) and an exterior surface (139).

Figure 7:
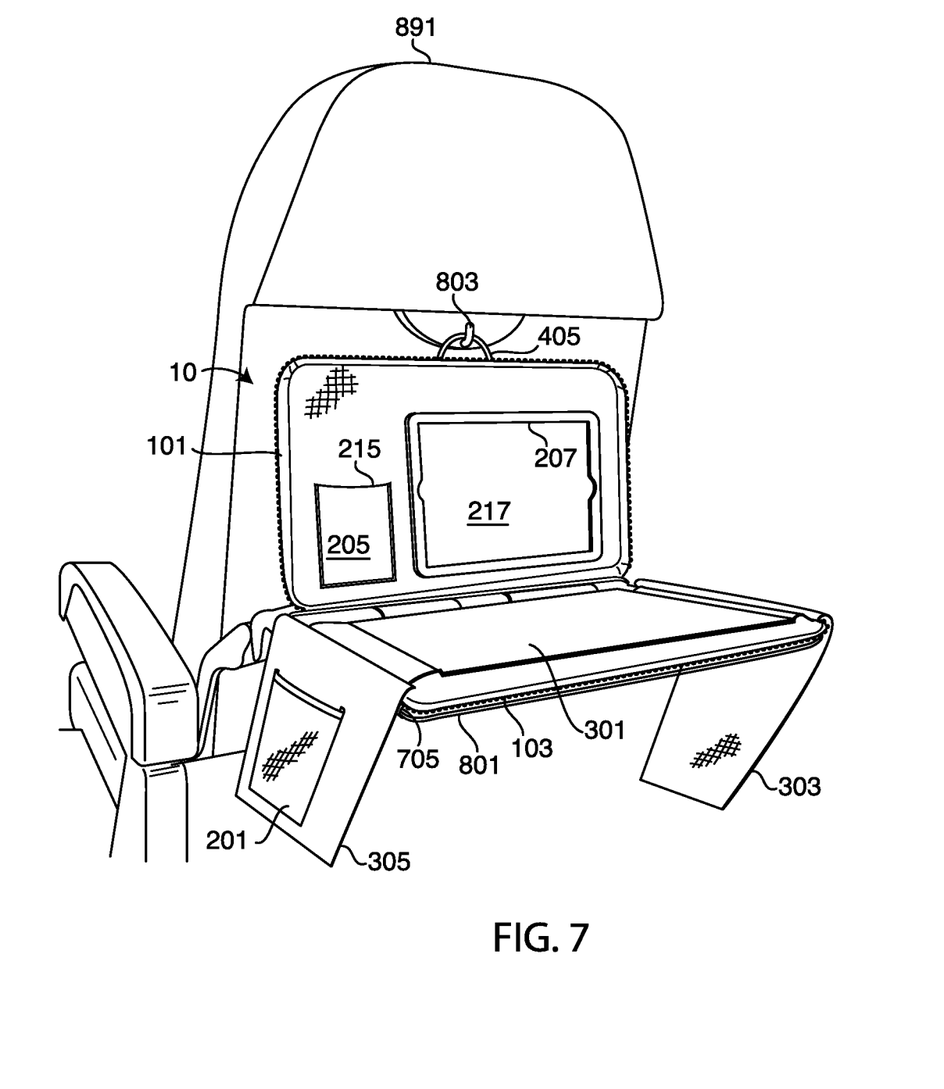
FIG. 7 depicts the organizer of FIG. 1 in place on an airline tray table in the deployed configuration.

The hinge (115) is generally simply a piece of flexible fabric, or similar material, which serves to interconnect the upright element (101) and the table element (103). In an embodiment, it may actually be the fabric of the main body (100) which is simply provided without any reinforcement to allow the two elements (101) and (103), which incorporate the same fabric, to rotate relative to each other. In an embodiment, the elements (101) and (103) may include certain reinforcing members to increase their stiffness. These can be, but are not limited to, plastic, cardboard, or similar types of materials. Stiffeners can provide for improved rigidity to the elements and make the main body (100) structure similar to that of a portfolio or briefcase of the prior art. In an embodiment, the upright element (101) and the table element (103) may be further connected by limiting straps (161), as shown in FIG. 7, which inhibit the hinge from rotating fully so that the upright element (101) and table element (103) have a fixed range of motion.

Figure 1:
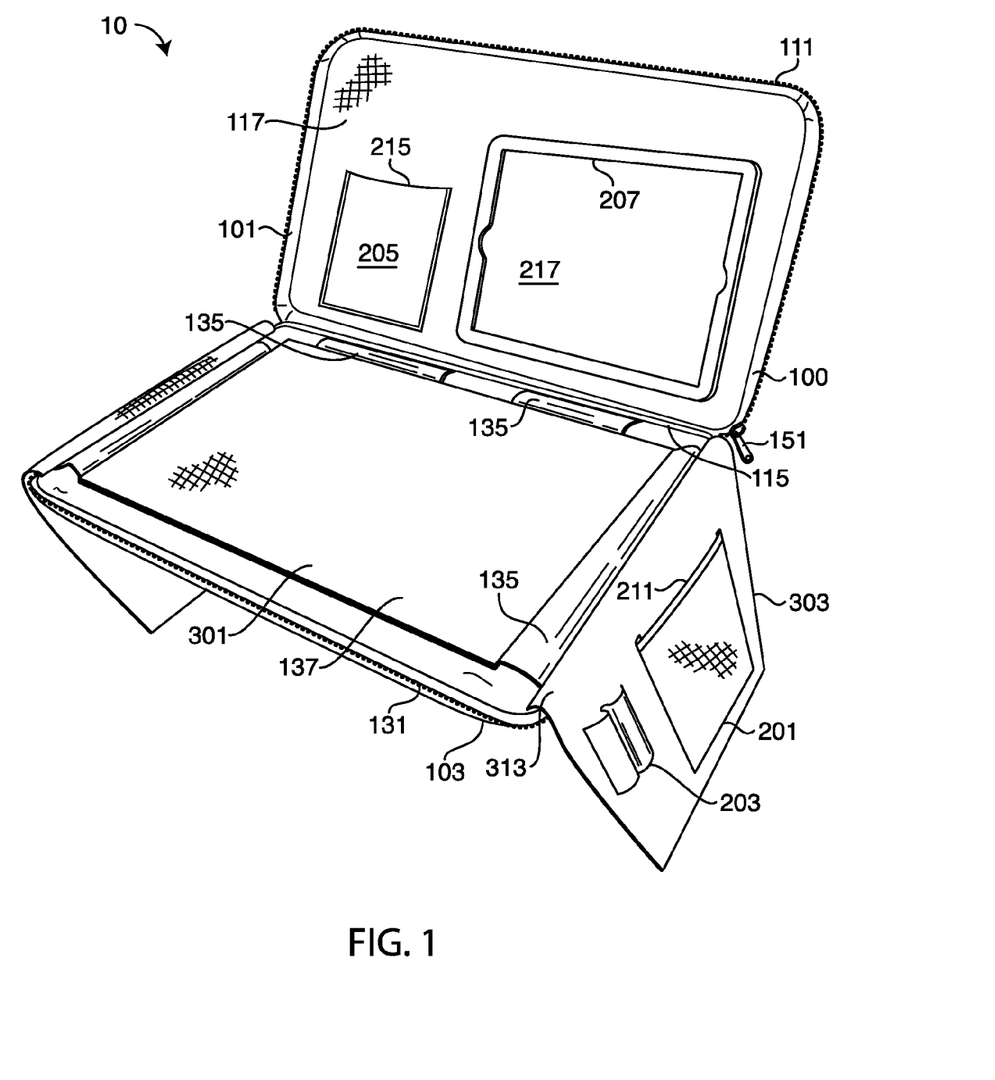
FIG. 1 depicts an embodiment of an organizer which is unfolded and arranged in its deployed configuration as it would be when in use.
Figure 2:
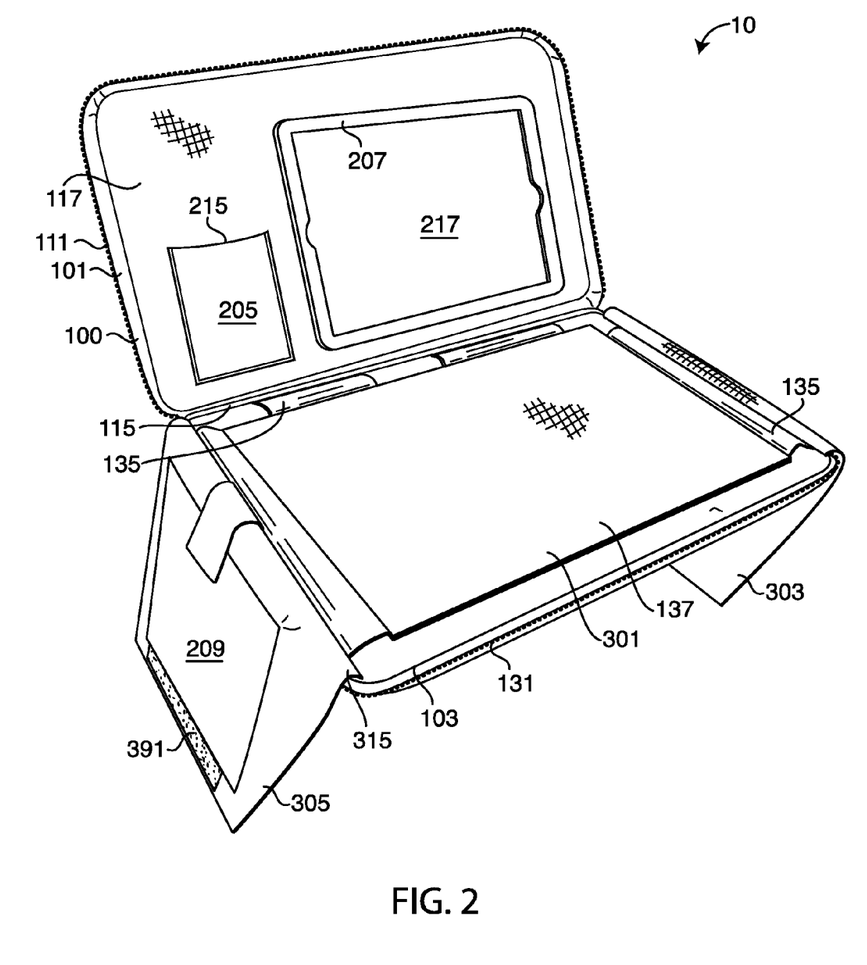
FIG. 2 depicts a reverse view of the organizer of FIG. 1.
Figure 3:
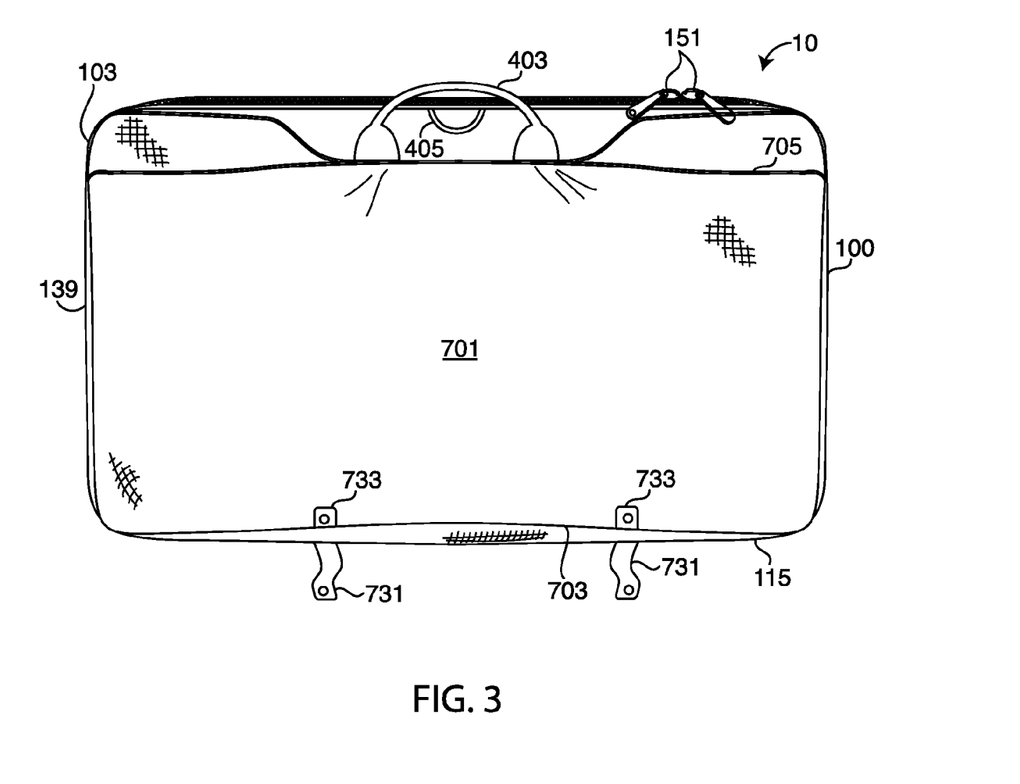
FIG. 3 depicts an embodiment of the organizer of FIG. 1 in its closed configuration which has been folded up for transport.
Figure 4:
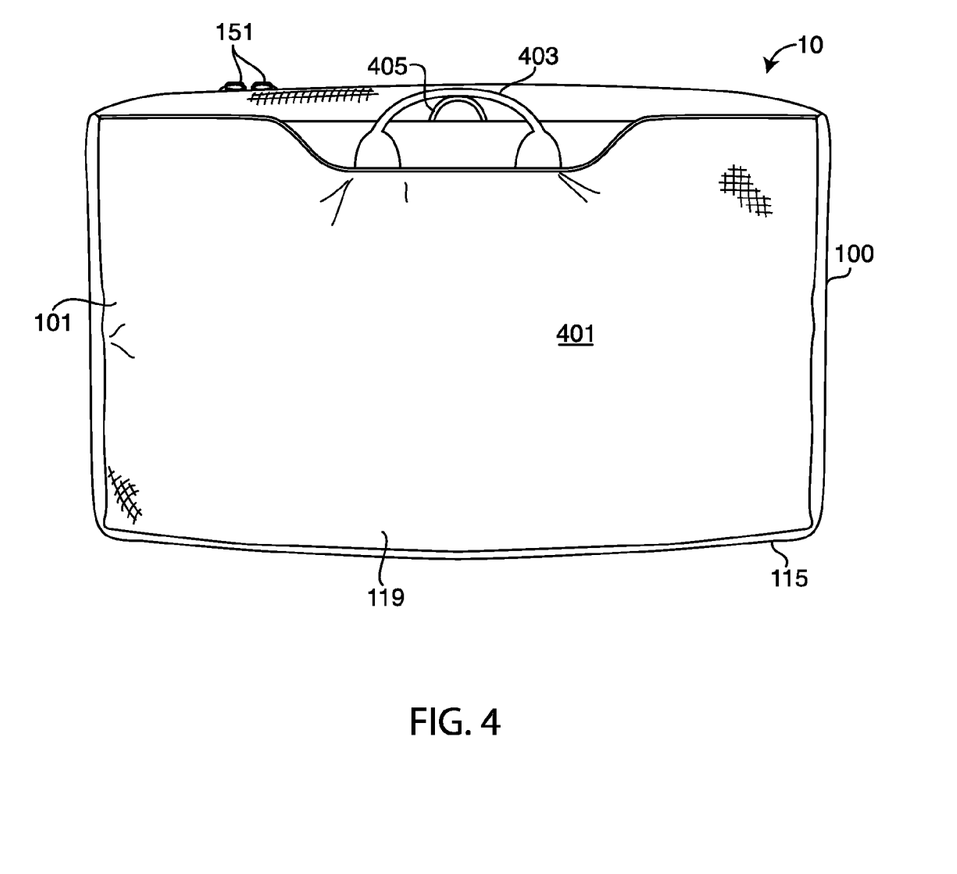
FIG. 4 depicts a reverse view of the organizer of FIG. 3.
Figure 5:
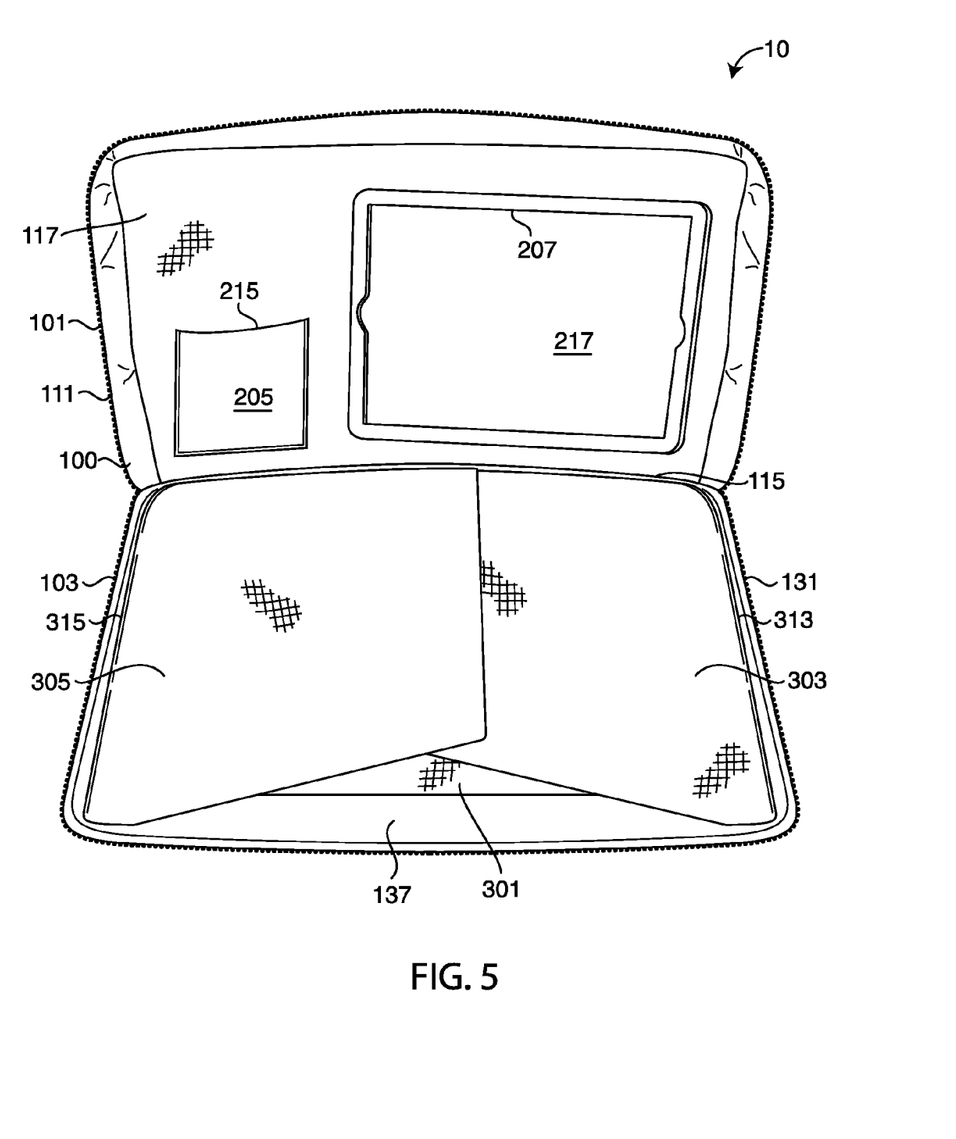

In a preferred embodiment, when the upright element (101) and table element (103) are folded together so that their interior surfaces (117) and (137) are in proximity to each other and closer to each other than their exterior surfaces (119) and (139) are to each other, the remaining edges of each element (101) and (103) each include a half set of interlockable zipper teeth (111) and (131). There is also included one or more zipper sliders (151) which may be engaged to cause teeth (111) and (131) to interlock and "close" the organizer (10) in a manner understood by those of ordinary skill. FIGS. 3 and 4 depict the organizer (10) in such a closed configuration. When the zippers (151) are undone, the organizer (10) may be placed in its open configuration as shown in FIG. 5, or its deployed configuration as shown in FIGS. 1 and 2.

The interior surface (117) of upright element (101) generally includes one or more organizing compartments (205) and (207). In the depicted embodiment of FIG. 1, organizing compartments (205) and (207) are attached to and integral to the interior surface (117) of the upright element (101). The depicted phone compartment (205) is generally a pocket sized and shaped for holding a mobile phone, smart phone, palmtop computer, music player, or similar device. It also may be sized and shaped to hold a pair of eyeglasses or may be a frame pocket as discussed below for the tablet compartment (207) to allow access to a front touchscreen. The phone compartment (205) is generally a rectangular pocket of standard design formed from a flexible elastic material and attached to interior surface (117) of the upright element (101) along three edges, with the top edge (215) being unattached so as to accept items placed into the pocket. This pocket construction is used in a number of compartments in the organizer (10) and is well understood by those of ordinary skill in the art.

The phone compartment (205) is preferably made from a flexible material which may expand so as to accommodate various sizes and thicknesses of devices and objects. The phone compartment (205) as discussed in more detail later, is primarily designed to provide a storage location for items that may be in use, but are not desired to potentially clutter up the work surface (301) and are therefore stored in a pocket.

Business and recreational travelers commonly store smart phones in protective sleeves, covers, or boxes to prevent damage and these protective devices generally add bulk to smart phones. Further, they often wish to keep these devices handy during a flight as they can provide for music and functionality. However, they often have their data and voice connections disconnected when onboard an airplane in flight, and therefore, they also usually have more limited use than they normally would. By forming the phone compartment (205) from a flexible material, phone compartment (205) can expand to accept various sizes of smart phones and related devices, devices in additional protective devices, and non-phone or electronic related objects such as eyeglasses. With regards to electronic devices, many of their common controls are still accessible when the device is placed in a pocket.

It is generally preferred that phone compartment (205) be made from an elastic material, so that when a device is placed in phone compartment (205), the material will tend to hold the device in the phone compartment (205) in a generally fixed orientation and inhibit the device from becoming dislodged from the phone compartment (205). It is also generally preferred that the phone compartment (205) be made from a material that "breathes"—that is, which facilitates air flow through the material—such as, but not limited to, webbing. This is because smart phones and other devices which may be stored in component (105) are essentially compact computing devices with microprocessors which generate and radiate heat and a breathable construction can provide for improved heat dissipation.

There also is provided on the inside surface (117) of the upright element (101) a tablet compartment (207). The tablet compartment (207) is preferably a window pocket. That is, a pocket with a hole (217) through its major face. The tablet compartment (207) is designed to provide a "frame" into which a tablet computer such as, but not limited to, an iPad™, a Surface™ or a GalaxyNote™ may be placed. The tablet compartment (207) is arranged as a frame so that the device, when placed therein, is generally held in place but the vast majority, if not all, of the screen surface is accessible through the opening (217) in the pocket. This provides full visibility of the screen, and also allows for the screen to be touch activated in the standard fashion.

The tablet compartment (207) can be used to hold a tablet computer in any orientation, but it is generally preferred that the tablet computer be arranged so that it's major dimension corresponds to the major dimension of the upright element (101). It is preferred that the tablet compartment (207) be sufficiently rigid to hold the tablet computer steady, even in a vertical or primarily vertical orientation, but still be sufficiently flexible to accommodate a number of different tablet computing devices and to not potentially damage other objects in the organizer (10) when it would contact them.

Attached to the interior surface (137) of the table element (103) there is provided a work surface (301). This surface (301) is generally arranged so as not to be rigidly connected at three sides to the inner surface of the table element (103), but may include elastic connectors (135) so as to create a large expandable pocket covering a majority of the inner surface (137). This will often be sized and shaped to accommodate standard paper sizes and file folders. The work surface (301) may comprise multiple layers of fabric which may include a filler therein. In an embodiment, the work surface (301) is constructed to provide a suitable writing surface where paper can be written on directly without significant difficulty, without providing a surface which is overly rigid and could lead to damage to objects in contact with it.

Attached to the interior surface (137) of the table element (103) there are also two wings or flaps (303) and (305). These comprise generally flexible fabric elements attached at opposing ends of the table element (103). In the depicted embodiment, the two flaps (303) and (305) are attached, via hinges (313) and (315), to the table element (103) at the sides adjacent to hinge (115) connecting the table element (103) to the upright component (101). The hinges (313) and (315) do not need to be separate objects but, in the depicted embodiment, simply comprise an amount of the fabric of the flaps (303) and (305) sufficient so that the remaining fabric of each flap (303) and (305) can rotate about them. The flaps (303) and (305) are designed to fold into the inside of the main body (100) in the open and closed configurations of the organizer (10) as illustrated best in FIG. 5. Each flap (303) and (305) may include one of two mating fastener parts (391), such as hook and loop fastener strips, snaps, or reusable adhesives. The fastener parts (391) can allow the flaps (303) and (305) to be held in the open position of FIG. 5 until a user purposefully separates them to place them in the deployed position of FIGS. 1 and 2.

Each of the flaps (303) and (305) will also generally include a number of compartments (201), (203), and (209) designed to hold various objects in a manner akin to the compartments (205) and (207) discussed above. However, these compartments (201), (203), and (209) will generally be sized and shaped for different objects and to provide different function. In the depicted embodiment, the book compartment (209) is generally sized and shaped to accept most basic sizes of paperback books, electronic reading devices (e-readers), electronic devices which are larger than standard smart phones, similar devices which would not be placed in the phone compartment for some reason, or to simply accept basic office supplies, tools, snacks, or objects that a person may want onboard an airplane.

The pen compartment (203) generally comprises two adjacent attached sleeves which are sized and shaped to hold smaller cylindrical objects such as pens and pencils. The cup compartment (201) is sized and shaped to hold a variety of beverage containers including, but not limited to, single use disposable cups, and will be discussed in greater detail later in conjunction with FIGS. 6A and 6B.

The flaps (303) and (305) will generally have the various compartments (201), (203), and (209) attached in a manner so that, as shown in FIGS. 1 and 2, the compartments (201), (203) and (209) are located external and directed away from the table element (103) when the organizer (10) is deployed. That is, if the outside surface of the table element (103) is resting on a surface, and the flaps (303) and (305) are unfolded to rest on the same surface, the compartments (201), (203) and (209) are on the outside. As will be understood by one of ordinary skill, this may mean that the compartments (201), (203) and (205) are on opposing surfaces when comparing the flaps (303) and (305) to each other. Similarly, it will generally mean that the compartments (201), (203) and (209) are arranged to contact the work surface (301) when the flaps (303) and (305) are folded as in FIG. 5.

The cup compartment (201) is designed to provide for specific support for a container of fluid which can be placed in the cup compartment (201). While it is not required that the cup compartment (201) be used to hold a container of fluid and it can hold other objects, containers of fluid such as but not limited to, bottles, cans, cups, lidded cups and related vessels are commonly used by passengers on aircraft.

The cup compartment (201) will generally be formed of an elastic material such as, but not limited to, elastic mesh, and may include an elastic, or other constricting (such as by drawstring), top edge (211). The pocket making up the cup compartment (201) is generally designed so that a beverage container, such as a bottle or can, placed therein is held relatively rigidly therein. Because of this, one of ordinary skill would recognize that a pocket design is not required and a cup shaped container, a flexible ring and fabric bag arrangement, or other constructions can be used in alternative embodiments. Specifically, any design can be used where there is generally little movement of the beverage container relative to the cup compartment (201).

In the depiction of FIGS. 1-5, it should be immediately apparent how the cup compartment (201) holds a standard resealable bottle without risk of spillage. However, in an embodiment, the cup compartment (201) is capable of holding a much wider variety of beverage vessels, including open-topped cups, with a reduced risk of spillage.

In an embodiment, the beverage vessel being placed in the cup compartment is a particularly common one used on the airplane. This is a standard plastic disposable cup (a service cup) of the size and shape commonly used for airline beverage service in economy class. These cups commonly hold between 8 and 10 oz. of liquid. Alternatively, it may be a glass or plastic vessel such as a wine glass or other drinking vessel of a type known to those of ordinary skill which can be provided in the first or business class cabin of an airplane.

Regardless of the particular vessel to be used, the cup compartment (201) will generally be sized and shaped so as to hold a wide variety of vessels in a generally fixed position relative to the cup compartment (201). For example, in the case of a stemmed vessel, the stem would generally be held perpendicular to the top edge (211). Generally, it will be preferred that the plane incorporating the rim of the beverage vessel, be generally perpendicular with the plane of the top edge (211) of the cup compartment (201).

Figure 6A:
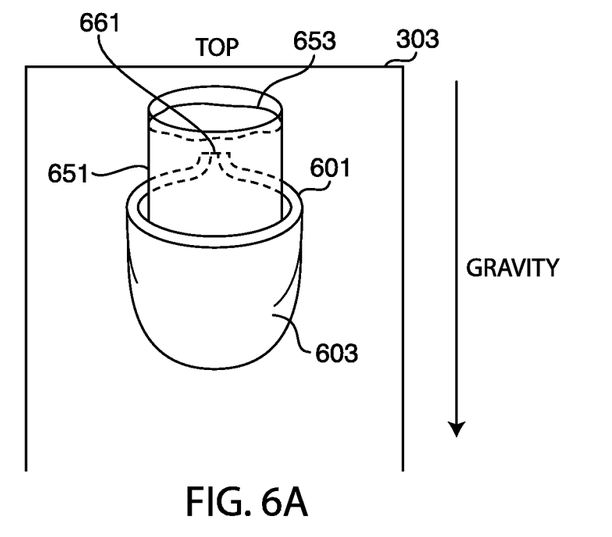
FIGS. 6A and 6B depict an embodiment of a rotating cup compartment showing relative movement.
Figure 6B:
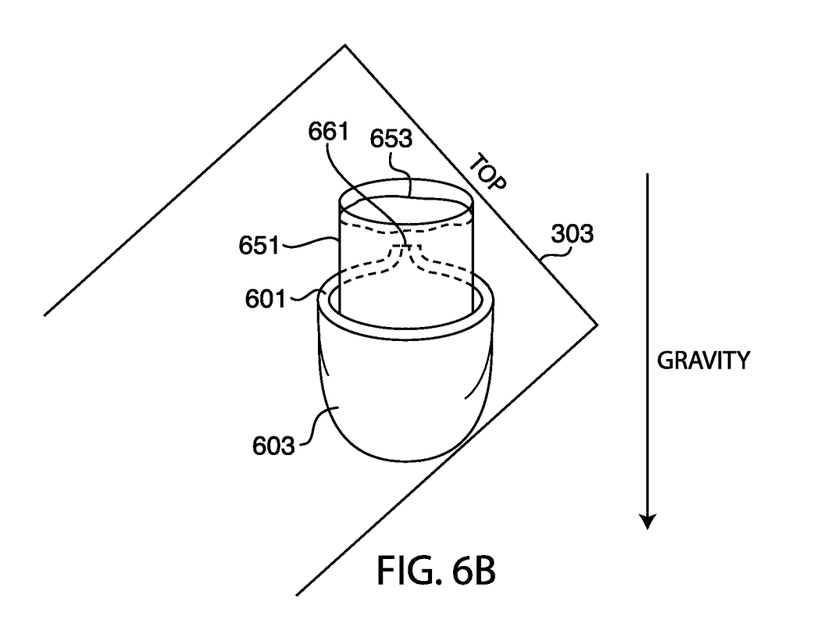

In an embodiment, the cup compartment (201) is attached to the main body (100) via a rotational or flexible connection. An embodiment of such a connection is shown in FIGS. 6A and 6B. The connection will generally allow the cup compartment (201) to rotate relative to the main body (100). In an embodiment, the attachment to the main body (100) is via the flap (303) or (305). This allows for rotation of the cup compartment at a location generally below the work surface (301). While a rotational connection to the main body (100) and/or flap (303) or (305) is not required in all embodiments, such a connection allows for the cup compartment (201), if properly engineered, to generally remain upright (that is with its top edge (211) as its highest level) even as the flap (303) is rotated vertically. FIGS. 6A and 6B indicate a rotation of the flap (303) where the top of the flap (303) would comprise the part generally connected to the table element (103).

In the embodiment of FIGS. 6A and 6B, the cup compartment (201) comprises a flexible ring (601) with a fabric bag (603) below it. The ring (601) is connected to the flap (303) at a rotational point (661) which may comprise a rivet, ball bearing, shaft, or similar structure. The bag (603) is not attached to the flap (303) except via the ring (601). When the flap (303) rotates (moving from FIG. 6A to FIG. 6B), the beverage vessel (651) remains upright relative to gravity. Thus, the fluid (653) in the vessel (651) in the cup compartment (201) generally will not spill over the lip of the vessel (651). While FIGS. 6A and 6B indicate only one type of arrangement, it would be understood by one of ordinary skill in the art that multiple different arrangements, devices, and means to provide the rotation could be alternatively or additional be used in other embodiments. In particular, the cup compartment (201) could be attached by a wide variety of different forms of connectors and comprise a variety of different shapes and designs. Further, in an embodiment, such as that of FIG. 8, the rotational point (661) may be unnecessary as the flap (303) hinge (313) may be sufficiently flexible to allow for the same type of rotational motion by allowing the flap (303) to rotate relative to the table element (103).

FIGS. 3 and 4 provide for additional detail on the exterior surfaces (139) and (119) of the organizer (10). The exterior surface (139), as indicated in FIG. 3, will generally have a sleeve (701) attached thereto. The sleeve (701) may be open on two opposing edges (703) and (705), or may be a pocket which is closed on the third end (705). The sleeve (701) is generally sized and shaped so that it can accept therein a standard airline tray table. Regardless of whether a two-side-connected or a three-side-connected structure is used as sleeve (701), the opening (703) of the sleeve (701) will generally be arranged so as to be closer to the hinge (115) than the opposing side (705) of the sleeve (701). In many respects this would be considered upside-down on the main body (100) as can be seen in FIG. 3. However, this arrangement allows for a tray table to be inserted into the sleeve (701) via opening (703) with the structure of the chair to which the tray table is mounted closer to the hinge (115) of the main body (100).

In an embodiment, the sleeve (701) can include various forms of straps, connectors, elastic, or similar devices which serve to hold the organizer (10) more rigidly to the tray table when a tray table is inserted in the sleeve (701). For example, the sleeve (701) may have a plurality of straps attached toward the open edge (703) of the sleeve (701) toward the hinge (115). These straps may allow for free passage of the tray table into the sleeve (701), and then can go around the back of the tray table and connect with a mating connector on the outside of the hinge (115) or other structure of the main body (100).

In the depicted embodiment of FIG. 3, the straps (731) are attached in a reversed arrangement where the straps (731) are attached to the main body (100) and the mating connectors (733) are attached to the sleeve (701). In a still further embodiment, the sleeve (701) may not have a strap to inhibit the sleeve (701) from separating from the tray table, but may include a tightening or tensioning device where the size of the sleeve (701) can be constricted and the friction between the sleeve (701) and the tray table can be dramatically increased. Similar devices and means for attaching the sleeve (701) to the tray table can alternatively or additionally be used in combination with any combination of the above. Further, while the sleeve (701) is generally depicted as having a fairly monolithic structure, this is not required and devices, systems, and means capable of attaching the table element (103) securely to a tray table may be used instead of, or in addition to, the sleeve (701).

As shown in FIG. 4, the exterior surface (119) of the upright element (101) may include a standard pocket (401) or any other type of storage compartment, or may have nothing thereon. In an embodiment, the outside (119) may be embroidered, printed, or otherwise marked with a logo or pattern to improve the aesthetic appearance of the organizer (10).

As can be best seen in FIGS. 3 and 4, both the upright element (101) and the table element (103) will generally also include a handle (403) and a flexible connector or a hook (405). The handle (403) is self-explanatory to one of ordinary skill in the art and comprises a loop generally attached to the exterior surfaces (119) and (139) of the organizer (10) which extends beyond the edge of the organizer (10) to allow the organizer (10) to be carried by hand in the manner of a briefcase. It is generally preferred that the organizer (10) be carried with the hinge (115) down to inhibit objects within it from falling out of the organizer (10). Thus, the handle (403) loops will generally extend from the two edges of the table element (103) and upright element (101) opposing the hinge (115). This is by no means required, however.

In the depicted embodiment, the hook (405) is a small loop of an elastomeric material which is mounted toward the same edge as the handle (403). The hook (405) is depicted smaller than the handle (403), but this is by no means required. Further, the hook (405) need not be flexible. Instead, the hook (405) is designed to provide an attachment point to an external object and can be flexible or rigid. However, in the event that the hook (405) is rigid, the connection of the hook (405) to the organizer (10) will generally be flexible or adjustable. In particular, in an embodiment, the distance that the hook can project above the edge of the element (101) or (103) may be changeable such as through the use of a ratcheting mechanism, flexible construction, or an expandable part.

The organizer (10) is designed to be used as a portable work or entertainment station, particularly for use on an airliner in an economy seat where space is often at a premium. FIG. 7 shows an embodiment of how the organizer (10) in its deployed configuration can be used to increase the useable space and provide organization to a tray table (801) in an airliner.

In operation, the organizer (10) would generally be setup and utilized as follows: a user would first arrive at their seat with the organizer (10) in the closed configuration of FIGS. 3 and 4. They would generally be using the organizer (10) as at least a portion of their carry-on luggage and will have previously packed it with items they will want to use in their seat. These will generally be items used to carry out business such as, but not limited to, files, a tablet computer, pens and pencils, or items that may be used for personal entertainment such as, but not limited to, a music player, a tablet computer, and a book or e-reader. These items will generally be enclosed inside the main body (100) of the organizer (10) and may be within the various compartments (201), (203), (205), (207), or (209) or may be loose inside the main body (100). The user will organize their other belongings and sit down in their seat keeping the organizer (10) accessible such as under their seat or in their lap. It may be placed in an overhead bin in the same manner as any other piece of carry-on luggage in an alternative embodiment. In a still further embodiment, the organizer (10) can hang from the latch (803) in its closed configuration.

Once the user is satisfied that it is time to deploy the organizer (10), they will generally lower the tray table (801) for their seat, which is attached to the back of the seat (891) in front of them, and retrieve the organizer (10). They will place the tray table (801) into the sleeve (701) and will attach the connectors (731) and (733) to securely attach the organizer (10) to the tray table (801). Generally, they will then unzip the organizer (10) to place it in its open configuration of FIG. 5. In an alternative embodiment, the organizer (10) may already be in a partially open or open configuration prior to placing the sleeve (701) on the tray table (801). The upright element (101) will generally be rotated about the hinge (115) until it is in a generally "L-shaped" configuration with the table element (103). The upright element (101) comprising the upright of the "L" and the table element (103) comprising the "L" base. Essentially, the two elements (101) and (103) are loosely perpendicular to each other.

Once the elements (101) and (103) are so arranged, the hook (405) on the upright element (101) will then be attached to the rotating latch (803) or other object on the back of the seat (891) that is normally used to secure the tray table (801) in its upright and locked position for takeoff and landing. While this connection is preferred, if such a latch (803) is not available, the hook (405) may be attached in an alternative fashion to the seat back such as by connecting to an Airphone™ cradle, a portion of an entertainment system, or connecting directly to the seat back such through a pin or the hook portion of a hook and loop fastener.

As the hook (405) is mounted to the upright element (101) in a generally elastic or adjustable fashion, the hook (405) can generally accommodate a variety of different tray table (801) sizes and designs while still holding the upright element (101) of the main body (100) in a generally vertical orientation as shown in FIG. 7.

Once the table element (103) has been secured to the tray table (801) and the upright element (101) has been secured to the latch (803), the user will then generally unfold the flaps (303) and (305) allowing them to hang down the two opposing sides of the tray table (801) as can be seen in FIG. 7. This reveals the work surface (301) which is now generally perpendicular to and in close proximity with the upper surface of the tray table (801). The organizer (10) is considered deployed at this time and ready for work.

As should be apparent from FIG. 7, the organizer (10), by it arrangement of components, provides for a convenient area for performing a variety of different tasks and increases the useable space for a person in a confined area. In the first instance, the user can write or type on the work surface (301) as they would normally use the tray table (801) such as by placing a pad of paper or a laptop computer thereon. However, as the work surface (301) can have structure specifically designed for such tasks, for example based on elasticity of response and the like, this can actually improve the work surface. Further, objects that may be needed for the work can be stored in compartments (201), (203), (205), (207), or (209) to keep the work surface (331) from becoming cluttered while still keeping those items immediately at hand.

Further, the tablet computer and smart phone, if placed in the tablet compartment (207) and phone compartment (205) respectively, are held generally vertically. This can assist if the tablet is being used as a monitor, such as with a connected keyboard which is placed on the work surface (301) or if the user wishes to utilize the tablet to watch a movie. As the tablet is held at a convenient position and angle for viewing from the seat, there is no need to hold the tablet when it is being used in this manner which can be more comfortable for the user. It also allows the user to lean back in their seat to view the screen as opposed to having to lean forward over the tray table (801) to view the screen which is laying horizontally. Similarly, if a smart phone is being used as a music player and is located in the phone compartment (205), it is readily accessible and many of the major controls (such as volume) can be accessed without removing it, so it also does not clutter up the work surface (301).

Still further, when airline beverage service is provided, the user does not need to place their beverage on the tray table (801) or on the work surface (301). Instead, they can secure their beverage in the cup compartment (201). This allows the beverage to hang beside the organizer (10) which can provide a number of beneficial functions. In the first instance, should the beverage be spilled, it will generally not spill onto the work surface (301) because the vessel is held below the level of the work surface (301). Thus, it is less likely that turbulence, or a passenger moving the seat (891) to which the tray table (801) is connected, will cause a spill onto valuable materials on the work surface (301). Further, the vessel is even further removed from expensive electronics which are generally mounted vertically on the upright element (101) and above the work surface (301).

A second benefit of having the cup hang down the side is that the rotational connection of the cup compartment (201) can allow the beverage vessel to adjust its position relative to gravity freely. Thus, in the event that the aircraft is ascending or descending, the cup compartment (201), and the vessel within it, will generally be positioned so as to not spill the beverage from the vessel, even if the vessel is open-topped.

Once the organizer (10) is deployed, it should be apparent that it provides for a significant amount of available workspace in a place where workspace is often at a significant premium. A further advantage of the organizer (10) is, because of its form of connection, it generally does not have to be packed up during the flight to accommodate a passenger sitting closer to the window than the one using the organizer, to get out of their seat. Particularly with economy airline seats where there are more passengers per row and less legroom, getting out from a middle or window seat, past the aisle seat, generally requires persons closer to the aisle than the person getting up to get out of their seats. Further, the seats are generally so close that it is near impossible to squeeze past a tray table (801) which is down. Thus, when someone needs to get out of their seat, everyone else in the row basically has to stop doing everything they are doing, move items to different storage locations, and try to get out of the way.

Figure 8:
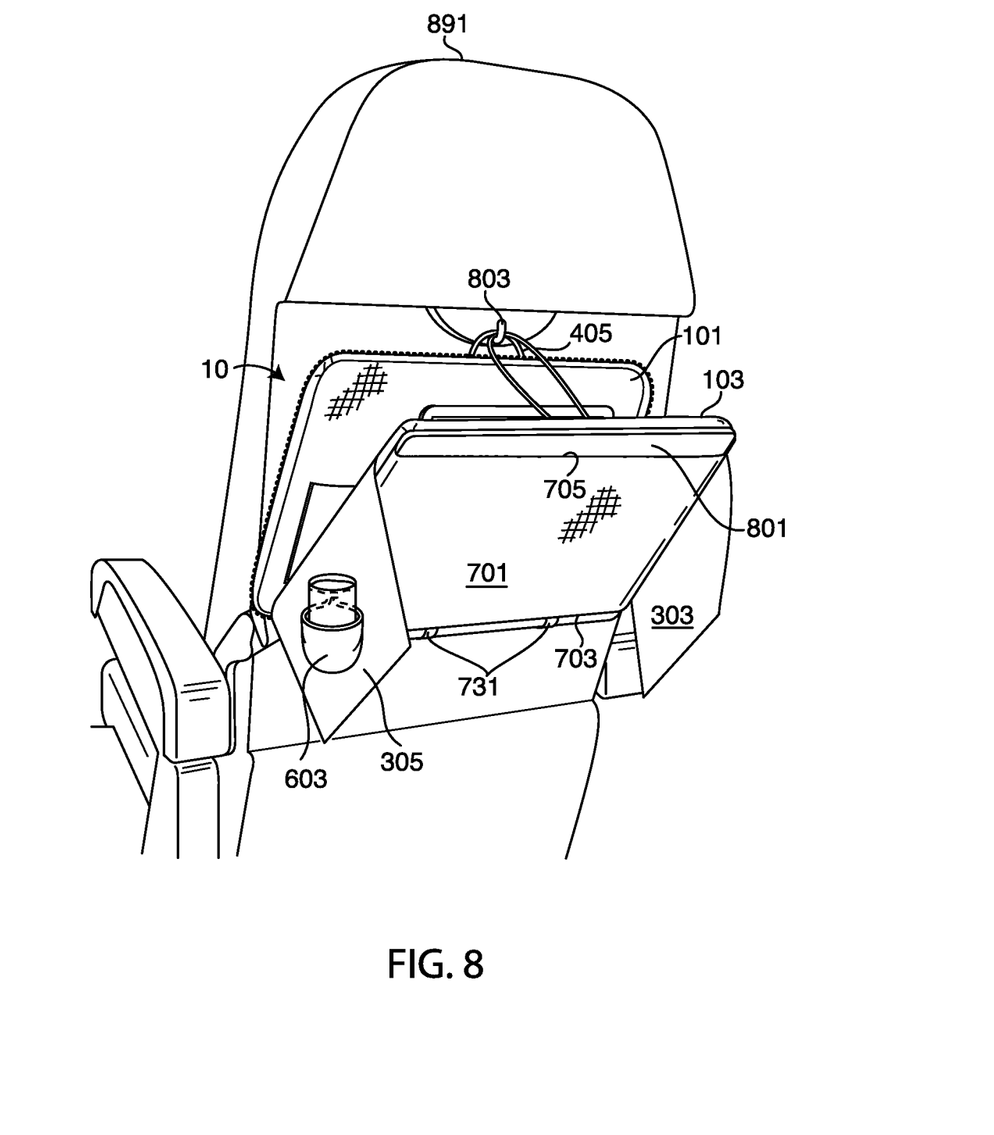
FIG. 8 depicts the organizer of FIG. 1 in place on an airline tray table in the accommodative or passage configuration.

Organizer (10) reduces the problems of getting out of the way by allowing the organizer (10) user to partially fold their tray table (801) and secure it in a partially upright manner referred to as an accommodative configuration. As shown in the embodiment of FIG. 8, the tray table (801) can simply be folded up with the organizer (10) in place. In this arrangement, the hook (405) on the table element (103) which, as discussed above is securely attached to the tray table (801) via the sleeve (701), can be attached to the same latch (803) as the hook (405) from the upright element (101).

The organizer (10) generally prevents the tray table (801) from being completely returned upright and items in it can generally not be conveniently used when in the accommodative configuration, but it can provide for significantly more space to get past than when the tray table (801) is down. Further, because of the arrangement of the compartments (201), (203), (205), (207), and (209) and the position of the hinge (115), objects in and on the organizer (10) will generally not be able to fall on the floor when the organizer is in the arrangement of FIG. 8.

It should be recognized, that depending on what is being used on the work surface (301) or within the organizer (10), the amount the organizer (10) will allow or inhibit movement of the tray table (801) between its open and upright positions is variable. However, the organizer (10) and tray table (801) can generally move sufficiently to allow for a passenger to pass by them when the organizer (10) is in the accommodative configuration. Further, it is possible that a user can also grab certain bulky or fragile items from the work surface (301) to further increase the amount the tray table (801) can approach upright in the accommodative configuration.

As the flaps (303) and (305) are generally not rigidly connected to the table element (103) via their respective hinges (313) and (315), they will generally flop-down under the force of gravity against the back of the seat (891) when the organizer (10) is placed in the accommodative configuration. Most importantly, as the cup compartment (201) can generally rotate relative to the main body (100) or flap (303), or the flap (303) can rotate sufficiently to accommodate the cup compartment (201), that, in an embodiment, a cup, even one without a lid, can be left in the cup compartment (201) when the tray table (801) is rotated and the organizer is placed from the deployed to the accommodative configuration. The cup compartment (201) will rotate in counter direction to the rising tray table (801), keeping a beverage vessel therein generally upright, inhibiting the beverage from spilling. As carrying of beverages can often be a major cause of spills when people are getting in and out of seats, this can reduce the danger from such fluid spills.

Once the flight is completed, the user will generally reverse the process discussed above for attaching the organizer (10) to the tray table (801) to disconnect the organizer (10) from the tray table (801) and return the tray table (801) to its standard upright and locked position. This will generally be performed prior to landing for safety reasons. Upon leaving the airplane, the user can continue to utilize the organizer (10) as a small briefcase, portfolio, or similar "personal item" or carry-on piece of luggage carrying it via handle (403), under their arm, or attaching it to or placing it on another piece of luggage.

It should be apparent that while the above provides for discussion of the relatively specific organizer (10) design of FIGS. 1-5 with pockets for a variety of specific different components and designs, these components are by no means required in every embodiment. The organizer (10) is effectively a piece of luggage with a secondary function where it can be deployed to allow better space utilization. Thus, it can include other or fewer compartments as would be understood by one of ordinary skill in the art. In an alternative embodiment, the organizer (10) can include any, all, or none of the present compartments and these compartments may be provided in addition to or instead of other compartments of a type common in luggage. Further, while components such as hooks, connectors, and zippers are provided for various forms of connection in discussion with the embodiments herein, one of ordinary skill in the art would understand that such devices are relatively interchangeable with other components having similar function in alternative embodiments. Thus, hooks can be replaced with loops, mating fasteners positions can be reversed, and various other means and devices having the same or similar function to the components discussed herein can be used instead of, or in addition to, those discussed herein.

Still further, while the organizer (10) is generally intended to be used in conjunction with a tray table on-board an airplane, this is not required and one of ordinary skill in the art would understand that the organizer (10) can be placed in its deployed position in a variety of other circumstances and can be used in a variety of similar or different configurations to those discussed above. By means of example and not limitation, the organizer (10) could be used on a chair, on a table, or on another piece of luggage. The last of these can be particularly valuable as the upright element (101) can be attached to a luggage handle or similar device.

In an embodiment, the organizer (10) can also be utilized in a hybrid configuration where the organizer is hung from the latch (803) with the tray table (801) remaining in its upright and locked position. In this hybrid configuration, the organizer (10) essentially is allowed to freely hang from the latch (803). This configuration can be used if there is no need to place the organizer (10) in the fully deployed position to utilize it, in certain circumstances where it may need to be used without the tray table (801), or if the organizer is on an airplane where the seat (891) is of a configuration that the open and deployed positions contemplated in the FIGS are not obtainable. Still further, this hybrid configuration may be used in certain circumstances where the user, for whatever reason, does not want to attach the sleeve (701) to the tray table (801) and the organizer (10) can simply rest on the table (801) without being attached to it.

While this invention has been disclosed in connection with certain preferred embodiments, this should not be taken as a limitation to all of the provided details. Modifications and variations of the described embodiments may be made without departing from the spirit and scope of this invention, and other embodiments should be understood to be encompassed in the present disclosure as would be understood by those of ordinary skill in the art.

The invention claimed is:

1. A portable organizer comprising:
   a main body having an upright element, a table clement, and a hinge connecting them;
   a sleeve connected to said table element, said sleeve being sized and shaped to secure said table element to a tray table in an airplane;
   a first hook connected to said upright element, said first hook being sized and shaped to secure said upright element to a latch for holding said tray table in an upright and locked position;
   a second hook connected to the underside said table element, said second hook being sized and shaped to secure said table element to said latch for holding said tray table in an upright and partially folded position to allow passage of a passenger;
   a compartment attached to said upright element, said compartment sized and shaped to hold a tablet computer and disposed on said upright element to hold a tablet computer in a generally vertical orientation; and
   a second compartment attached to said upright element, said second compartment sized and shaped and hold a plurality of writing utensils.

2. The organizer of claim 1, wherein said upright element and said table element are arranged in a generally "L" shaped arrangement when said sleeve is secured to said tray table and said hook is secured to said latch.

3. The organizer of claim 1 further comprising, a compartment sued and shaped to hold a smart phone.

4. The organizer of claim 1 further comprising, a compartment sized and shaped to hold a e-reader.

5. The organizer of claim 1 further comprising, a work surface attached to said table element.

6. The organizer of claim 1 further comprising a handle attached to at least one of said upright element or said table element.

7. The organizer of claim 1 further comprising, a cup compartment for holding a beverage vessel.

8. The organizer of claim 7, wherein said beverage vessel comprises an open-topped cup.

9. The organizer of claim 7, wherein said cup compartment is rotationally attached to said organizer.

10. The organizer of claim 7, wherein said cup compartment is attached to a flap that is in turn attached to said table element.

11. The organizer of claim 1 further comprising a flap attached to said table element.

12. A method of providing organization to items on a tray table, the method comprising:
   providing an organizer comprising:
      a main body having an upright element, a table element, and a hinge connecting them;
      a sleeve connected to said table element, said sleeve being sized and shaped to secure said table element to a tray table in an airplane;
      a first hook connected to said upright element, said first hook being sized and shaped to secure said upright element to a latch for holding said tray table in an upright and locked position;
      a second hook connected to the underside of said table element, said second hook being sized and shaped to secure said table element to said latch for holding said tray table in an upright and partially folded position;
      a compartment attached to said upright element, said compartment sized and shaped to hold a tablet computer and disposed on said upright element to hold a tablet computer in a generally vertical orientation; and
      a second compartment attached to said upright element, said second compartment sized and shaped and hold a plurality of writin utensils;
   attaching said sleeve to said tray table in said airplane;
   attaching said hook to said latch for holding said tray table in an upright and locked position;
   placing an item in said compartment and placing an item in said second compartment to organize said tray table; and
   attaching said second hook to said latch to move said organizer on said tray table into the upright and partially folded position to allow passage of a passenger.

13. The method of claim 12, wherein said organizer further comprises a flap attached to said table element, said flap hanging from said table element over a first side of said tray table.

14. The method of claim 13, wherein said organizer comprises a second flap attached to said table element, said second flap hanging from said table element over a second side of said tray table, said second side opposing said first side.

15. The method of claim 12, wherein said organizer further comprises, a cup compartment for holding a beverage vessel, said cup compartment being rotationally attached to said organizer.

16. The method of claim 15, wherein said beverage vessel comprises an open-topped cup.

* * * * *